United States Patent [19]

DeCoste, Jr. et al.

[11] Patent Number: 4,705,715
[45] Date of Patent: Nov. 10, 1987

[54] ADHESIVE TAPES HAVING A FOAMED BACKING AND METHOD FOR MAKING SAME

[75] Inventors: Leonard D. DeCoste, Jr., Stoneham; Abboud L. Mamish, Natick, both of Mass.

[73] Assignee: The Kendall Company, Boston, Mass.

[21] Appl. No.: 923,939

[22] Filed: Oct. 28, 1986

[51] Int. Cl.⁴ .......................... B32B 3/26; B32B 5/14; B32B 5/18

[52] U.S. Cl. ............................... 428/246; 156/244.11; 428/247; 428/317.3; 428/319.9; 428/354

[58] Field of Search .................... 428/246, 247, 317.1, 428/317.3, 317.5, 317.7, 319.3, 319.7, 319.9, 354, 906; 156/244.11, 244.27

[56] References Cited

U.S. PATENT DOCUMENTS

| | | | |
|---|---|---|---|
| 3,530,031 | 9/1970 | Loew | 428/319.7 |
| 3,540,977 | 11/1970 | Schickedanz | 428/318.6 |
| 3,741,844 | 6/1973 | Schwartz | 156/244.27 |

Primary Examiner—William J. Van Balen
Attorney, Agent, or Firm—Alvin Isaacs

[57] ABSTRACT

Novel adhesive tapes comprising a cloth material and a layer of plastic foam having a thin plastic skin adhered to one surface and a layer of adhesive, e.g. a pressure-sensitive adhesive adhered to the opposed surfaces; and methods for making same.

13 Claims, 2 Drawing Figures

ADHESIVE TAPES HAVING A FOAMED BACKING AND METHOD FOR MAKING SAME

BACKGROUND OF THE INVENTION

The present invention is directed to novel adhesive tapes and, more particularly, to a novel laminar tape structure in which a layer of foam and a cloth scrim are sandwiched between a thin outer film and an adhesive layer, respectively.

Since the present invention is particularly useful in the preparation of so-called duct tapes, it will be described hereinafter by reference thereto.

As is well known in the art, duct tapes are customarily employed for such purposes as seaming metal ductworks, securing insulation and the like.

While in its simplest form, an adhesive tape may consist of a layer of adhesive coated onto a backing sheet in what may be called a two-layer structure, duct tapes should be strong as well as flexible. Consequently an intermediate cloth layer or scrim is sandwiched between the adhesive layer and backing for increased strength in typical commercially available duct tapes.

In such commercially available duct tapes, the adhesive layer will in general be any of the per se known pressure-sensitive adhesives, e.g. an acrylic or rubber-based pressure-sensitive adhesive, and the backing will comprise a polyolefin, e.g. polyethylene.

Duct tapes of this description are entirely satisfactory for their intended usage and accordingly have achieved wide market acceptance. Nevertheless, it will be appreciated that, like any commercially available product, there is always a great need for cost effective manufacturing whereby the cost for producing a tape of comparable end use properties may be significantly reduced.

It is to this task that the present invention is directed.

In order to solve this task, the individual components or elements which constitute the product must of necessity be considered. Applicants concluded that little or no cost savings could be realized by substitution of materials for the adhesive and cloth scrim. Consequently, attention was focused on the polyolefin backing which was typically on the order of about five mils thick and, in terms of raw materials, constituted a significant portion of the total cost.

BRIEF DESCRIPTION OF THE INVENTION

In accordance with the present invention, the aforementioned task is elegantly solved by employing a foam tape backing provided with a thin outer skin in lieu of the solid backings heretofore employed.

The novel tapes of this invention will accordingly comprise a laminar structure consisting essentially of, in order, a thin skin outer layer; a layer of foam; a cloth scrim; and a layer of adhesive, e.g. a per se known pressure-sensitive adhesive.

THE PRIOR ART

In general, insulation tapes for doors and windows, etc., comprising a layer of foam coated with a pressure-sensitive adhesive are well-known. Accordingly, illustrative patents to such structures need not be discussed.

U.S. Pat. No. 3,933,833 issued to Esmay discloses a polyurethane foam pressure-sensitive adhesive tape designed to act as a cushioning gasket for automobiles. As stated in Col. 4, the tape is conveniently manufactured by coating the foam producing mixture onto a pressure-sensitive adhesive transfer tape or a web having a low-adhesive surface is lightly pressed against the foam producing coating. Foaming against the low-adhesion web and the pressure-sensitive adhesive coatings is said to produce dense skins.

U.S. Pat. No. 4,119,122 issued to de Putter, while not concerned with tapes, teaches a pipe insulating system wherein the pipe is covered with a foam plastic layer and then wrapped with polyethylene film produced by extrusion.

U.S. Pat. No. 4,358,489 issued to Green relates to foam laminates comprising a polyolefin or polyvinyl chloride foam layer coated on at least one surface with a specified pressure-sensitive adhesive, which laminate is said to be useful as a mounting strip for trim stripping on the sides of automobiles.

U.S. Pat. No. 4,389,270 issued to McClintock teaches a method for applying a composite pressure-sensitive adhesive material to a pipe for insulation. The material is in the form of multiple layers of adhesives and films. FIG. 4 shows a pipe insulated by a foam, but the foam is preformed to fit the pipe and is not part of the adhesive tape.

Figure 1:
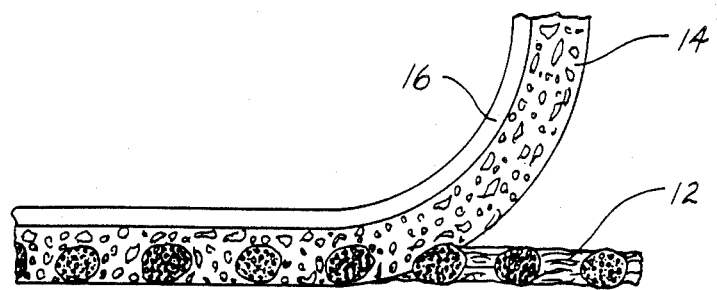
FIG. 1 is an enlarged sectional view illustrating this step of coextruding the skin and foam onto a cloth web in accordance with this invention.

U.S. Pat. No. 4,484,574 issued to DeRusha et al discloses a rolled foam tape which is useful to hold a bandage or as an athletic wrap. The foam has an adhesive surface, but does not include a backing strip. As shown in FIG. 1, the tape is made by passing a foam strip between rollers together with a release paper carrying an adhesive layer. The release paper is then peeled away.

U.S. Pat. No. 4,545,843 issued to Bray, relates to an adhesive tape manufactured by laminating at least one layer of a heat activated adhesive film to one layer of a substrate material, and coating the resulting laminate with a pressure-sensitive adhesive. The paragraph bridging Col. 2-3 teaches an embodiment (with reference to FIG. 4) wherein an insulating duct tape is provided having, in order, a foil layer, (2), a heat activated adhesive layer (6), a layer of foam (7), a second layer of heat activated adhesive (6a) and a layer (3) of pressure sensitive adhesive.

U.S. Pat. No. 4,567,091 issued to Spector discloses an adhesive sports tape having an open cell foam plastic core and opposing, gas-impermeable facing skins, one of which is coated with a pressure-sensitive adhesive layer to adhere the tape to the handle. The outer skin of the tape is engaged by the hand to the player. The gas filling cells of the core is entrapped by the skins, whereby when the tape-formed sheath is manually compressed by the player it seeks to rebound to its original shape, thereby providing a pneumatic cushioning action. The surface of the skins is irregular, thereby enhancing the grip characteristics of the sheath.

Figure 2:
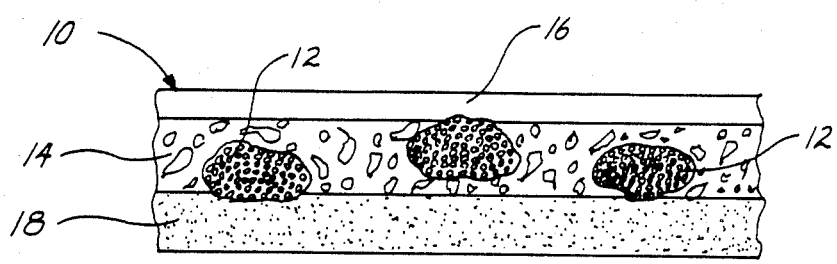
FIG. 2 is a similar view of the novel adhesive tape of the invention.

Canadian Pat. No. 655,867 issued to Turkewitsch relates to a foamed tape used for insulating pipes and other fluid conductors. Two embodiments are disclosed: (1) a sheet-like tape shown in FIG. 1 which folds over a pipe; and (2) a web-like tape shown in FIG. 7 which winds spirally over a pipe. In each of these embodiments, insulating material in the form of open or closed cell foam (3), as seen in FIG. 1, is carried by backing strip (2) provided with adhesive (6), the backing strip being wider than the insulating material which is tapered along it longitudinal edges. The tape shown in FIG. 1 is used as shown in FIG. 2 by wrapping the sheet around pipe (8) until the adhesive (6) on backing strip (2) adheres to the backing strip. In the embodiment shown in FIG. 7 thermal insulation (24) is adhered to backing (23) with only a single longitudinal edge (27) exposing the adhesive surface. The material can be spirally wound around a pipe, as shown in FIG. 8.

Finally, Japanese patent application No. 57-56872 of NHK Spring KK (filed June 4, 1982 and laid upon Dec. 10, 1983,,No. 58-173179) teaches a foamed sheet material comprising a layer of foam, e.g. of polyvinyl chloride, polystyrene, polyethylene, polypropylene, chloroprene or polyurethane; an intermediate film, e.g. of polyvinyl chloride, polyethylene, polypropylene, polychloroprene, polybutadiene, polyester or polyamide; and an adhesive layer, preferably a two-component hardening type acrylic adhesive. The foamed adhesive material is said to provide the advantages of being highly flexible and capable of free transformation corresponding to the shape of the adhered surfaces.

While not intended to be an exhaustive and comprehensive survey of the prior art relating to foamed adhesive tapes, the aforementioned patents are nevertheless believed to be fairly illustrative of the state of the art pertaining thereto.

DETAILED DESCRIPTION OF THE INVENTION

As was mentioned previously, the present invention is directed to a cost effective adhesive tape having an intermediate cloth layer for reinforcement and increased tensile strength, e.g. adhesive tapes of the type generally referred to in the art as duct tapes, the essence of the invention being the concept of replacing the polyolefin or other backing layer with a foam layer having an outer skin bonded thereto.

In its simplest form, duct tapes comprise a cloth material carrying an adhesive layer. While in theory, the adhesive coating could comprise any of the per se known heat- or water-activated adhesives, for ease of application by the user it will usually be one of the known pressure-sensitive adhesives. Useful adhesives for this purpose include acrylic or rubber based adhesive formulations. As will be well understood by those skilled in the art, such formulations also typically contain tackifiers, fillers and other components performing specific functions. Since a suitable adhesive for this purpose per se comprises no part of this invention and its selection will be a matter of individual choice within the expected judgment of the skilled worker, useful adhesives need not be discussed in further detail.

The cloth material employed will preferably be a woven web for easy tearabliity in the cross direction (CD), as distinguished from nonwovens which, due to their primary orientation in the machine direction (MD) are not readily tearable in the CD. Useful woven webs of this description may be made from known natural and synthetic fibers and also per se comprises no part of this invention.

For flexibility as well as the ability to manufacture the tape in roll form, the cloth ordinarily should not have a dense thread count. Consequently, with the woven cloths of lesser thread count density which would be employed, the adhesive layer will tend to flow through the cloth, making resulting product commercially unacceptable.

For this reason, duct tapes typically have an outer plastic layer laminated to the cloth layer. This plastic layer, which may be on the order of 4–6 mils thick, and may comprise any of the per se known flexible plastic support materials, e.g. a cellulose ester such as cellulose acetate, cellulose triacetate, and the like; a polyester such as polyethylene terephthalate, or a polyolefin such as polyethylene or polypropylene, the polyolefins being particulary useful backing materials.

In accordance with the present invention, a significant savings in the cost of the backing material is obtained if the solid plastic backing heretofore employed is replaced by a foam having a thin outer skin.

The thin outer skin is an essential part of the present invention.

Initial prototypes contemplated by Applicants for lowering the manufacturing cost consisted of only a single foam layer coated onto the cloth. However, the foam backing in these early prototypes exhibited cell distortion and film delamination upon unwinding from the tape roll. This problem was solved efficiently and elegantly by providing the thin protective outer skin.

The invention may be best understood by reference to the drawing.

FIG. 1 illustrates the step of applying a polymeric melt comprising layer of foam 14 and a thin outer skin 16 to a scrim or cloth web 12. As will be discussed in more detail hereinafter, the preferred method of doing so is by coextrusion of foam 14 and skin 16.

As is seen in FIG. 2, rather than being a discrete top coat, the foam melt permeates the interstices of the cloth whereby the cloth fibers may be said to be embedded in the foam layer. A layer of adhesive 18, e.g. a per se known pressure-sensitive adhesive is provided on the opposed surface thereof.

Skin 16 should be as thin as possible and may be on the order of 3 mils or less. The foam, on the other hand, should be appreciably thicker, e.g. on the order of 4–8 mils. In the preferred embodiment, both skin 16 and foam 14 comprise polyethylene, a low density polyethylene (LDPE) being particularly preferred. However, other materials such as polypropylene are also contemplated for the backing.

Cloth web 12 may be selected from any of the known web materials such as those heretofore employed in the manufacture of tapes. It may be made from natural or synthetic fibers and may, for example, be on the order of 4–8 mils thick.

Adhesive layer 18 may be on the order of 3–6 mils thick and, as previously stated, it is preferably a per se known pressure-sensitive adhesives, e.g. a rubber-based or acrylic adhesive formulation whose selection comprises no part of this invention and need not be discussed in further detail.

The novel tapes of this invention can be assembled by individually producing and sequentially coating the components parts. For example, the foam, skin and cloth may be individually supplied to a calendering operation to provide a laminar structure of these three components. An adhesive layer may then be coated onto the cloth substrate by known coating techniques.

However, the preferred method of manufacture in accordance with this invention utilizes per se known extrusion techniques wherein the foam and skin are coextruded onto the cloth web.

This preferred method of manufacture will now be described in detail, utilizing polyethylene for the backing material.

In the preferred embodiment, use is made of known coextrusion equipment for simultaneous extrusion of a LDPE foam and an LDPE skin.

On a laboratory scale, a chemical blowing agent (CBA) was utilized to produce the foam. As is known and understood, a CBA produces a gas in the polyethylene melt within a defined temperature range and expands the melt upon exit from the extruder die. The expanded polyethylene film exiting from the die exhibits up to twice the thickness of the unmodified (non-foamed and expanded) film.

For optimum results in manufacturing the foam, there should be a substantially uniform cell distribution which in turn requires a good mixing between the CBA and the polyethylene pellets. This may be readily accomplished with conventional mixing equipment, e.g. auger screw feeding hoppers which meter precise desired amounts of CBA. By way of further illustration, in the examples which follow, use was made of a polyethylene screw extruder equipped with mixing pins to obtain a more consistent density, e.g. an ultimate density reduction of on the order of 40%.

As is understood in the art, fairly precise temperature control should preferably be maintained throughout the foam extrusion processing in order to produce an optimum foam film. In the extruder hopper section and first barrel section for the foam, the barrel temperature should be kept below the CBA's decomposition temperature in order to avoid loss of gas through the hopper. In the second barrel section, the temperature is raised so CBA decomposition will begin at the end of this section. When the plastic (e.g. polyethylene) melt reaches the metering or final zone of the extruder, the CBA is almost entirely decomposed. Preferably, the plastic melt is kept under high pressure after decomposition to avoid premature cell expansion and cell coalescence. In order to do this, the remaining adapter sections are maintained at a low temperature. As the melt exits the die, the remaining CBA is decomposed and complete foam expansion occurs as the melt exits from the die.

As will further be apparent to those skilled in the art, the temperature selected will also have an effect on the cell size. Large cells are produced if the melt temperature is high and small cells are produced with a low melt temperature, assuming the lower melt temperature remains within the blowing agent decomposition range.

The particular CBA employed is not critical and may be selected from those heretofore known in the art. By way of illustration, mention may be made of azodicarbonamide, azobisformamide, azo(isobutyronitrile) and diazoamino benzene. In general, a CBA will, upon reaching its decomposition temperature, release nitrogen as the primary gas along with smaller quantities of a secondary gas or gases, e.g. carbon dioxide.

The selection of precise temperatures to be employed will be dependent upon such factors as the CBA and plastic selected and the cell size contemplated. Accordingly, they are not capable of precise quanitification. However, excellent results in foam and skin extrusion employing LDPE and azodicarbonamide as the CBA for producing the foam where achieved with the following processing conditions:

TABLE I

| PROCESSING CONDITIONS | | |
|---|---|---|
| MATERIAL | FOAM | PE SKIN |
| EXTRUDER | #1 | #2 |
| BARREL TEMP (°F.) | | |
| ZONE 1 | 320 | 330 |
| ZONE 2 | 370 | 350 |
| ZONE 3 | 395 | 370 |
| ZONE 4 | 360 | 390 |
| ADAPTER TEMP. (°F.) | 350 | 390 |
| MELT TEMP. (°F.) | 350 | 400 |
| DIE TEMP. (°F.) | 390 | 390 |
| MELT PRESSURE (psi) | 3,000 | 1,200 |
| SCREW SPEED (rpm) | 60 | 19 |
| TAKE-OFF SPEED (fpm) | 36 | — |

Direct injection of a gas or volatile liquid into the polymer melt is another method that may be used to foam polyethylene. Blowing agents that are used include: isopentane, fluorocarbon 11, fluorocarbon 12, dichlorotetrafluoroethane, carbon dioxide, nitrogen, and ammonia. The blowing agents are soluble in the molten polymer and expand the film upon exit from the die. The foaming action occurs when the blowing agent passes from a condensed state to a gaseous state. The most commonly used blowing agent to foam low density polyethylene is dichlorotetrafluoroethane (F-114).

Nucleating agents are also important in direct injection foaming. Some nucleating agents are: calcium carbonate, calcium hydroxide, calcium stearate, zinc stearate, aluminum stearate, talc, azodicarbonamide, and sodium bicarbonate. The nucleating agent controls cell morphology such as the number of cells formed, cell size, and cell distribution. The nucleating agent provides a starting location for the foaming to occur. Since the nucleating agent is not completely wetted by the polymer, the surface tension lowered allowing a point for easy gas release and a lower pressure in the melt.

Complex equipment is one disadvantage to this method of foam processing. The most commonly used direct injection system utilizes a tandem extruder configuration. In the primary extruder, the nucleating agent is fed with the polymer into the feed hopper. They are melted and partially mixed. At the metering section of the screw, the blowing agent is injected and mixed with the polymer and nucleating agent under pressure. Mixing pins are commonly used in this section of the screw. Just upstream of the injection point is a blister section on the screw. The blister section does not allow the blowing agent to flow back upstream and expand prematurely. It has a barrel to screw clearance of 15 to 45 mils. Once the blowing agent is introduced, the melt pressure must be kept high to avoid expansion of the blowing agent until the melt exits the die.

Because the blowing agent lowers the viscosity of the melt upon injection, after mixing is complete the melt is pumped into a larger, cooling extruder. The function of the cooling extruder is to cool the melt down to a desired temperature which will increase the viscosity of the melt and avoid early cell formation. At the end of the cooling extruder, the melt is forced through a die which generates the shape of the foam. Either sheet or profiles can be extruded.

When forming sheet, an annular die that utilizes the same spiral distribution method preferred in producing blown films is used. Annular dies are used because they produce a foam sheet that has uniform cell size, uniform cell distribution across the width of the sheet, and a smooth surface appearance. These characteristics are not commonly found when the foam is forced through a slot die. After the foam exits the annular die it is slit by a razor at one point and the sheet is laid flat and wound on a core.

Foam sheet less that 40 mils is not commonly produced using the physical foaming method because of low polymer melt strength upon exit from the die. Foam sheet and film less than 40 mils in thickness is commonly extruded using chemical blowing agents because they allow for optimum melt strength at thin gauges.

As previously mentioned, a CBA was utilized to produce the foam on the laboratory scale, due to limitations of space and equipment.

However, other means such a physical foaming are well known in the art and may in fact be preferable in production runs, even though the CBA system employed in the laboratory produced quite satisfactory results.

After applying the foam and skin to the cloth material, e.g. by coextrusion in the previously described manner, the adhesive coating may be applied to the thus formed laminate of skin, foam, and cloth utilizing per se known coating techniques, e.g. by passing the laminar web through a pair of calender rolls while depositing a quantity of adhesive at the nip of the rolls. As is understood, the thickness of the layer can be controlled in such an operation by adjustment of the gap or space between the calender rolls.

As mentioned, the particular adhesive employed is not critical and may be selected from the known adhesives, e.g. pressure-sensitive, water activated or heat activated adhesives, which are known to provide acceptable adhesion to the substrates contemplated by the end use, e.g. metal, plastic or the like.

Preferably, for most contemplated uses, the adhesives will be pressure sensitive for ease of application. A particularly useful class of pressure sensitive adhesives for this purpose are those known as rubber-based adhesives. The prior literature is replete with references to adhesive formulations containing natural rubber, synthetic elastomers and mixtures thereof, which may be employed in the tapes contemplaed by this invention. Such rubber-based adhesives may, and typically will, contain one or more tackifiers to increase adhesion, fillers and other reagents performing specific desired functions, e.g. plasticizers, curing agents, accelerators, sequestering agents and the like. In the illustrative tape described below, a butyl-based pressure-sensitive adhesive was employed.

The following example shows by way of illustration and not by way of limitation the practice of this invention.

EXAMPLE

Four tapes of varying thicknesses were prepared utilizing the LDPE coextrusion previously described, a polyester woven cloth and a butyl rubber-based adhesive formulation. As seen from photomicrographs, the cell sizes of the foam layer ranged from 1.6 to 3.2 mils in diameter.

Their relevant properties along with those of controls are set forth in the following table (Table II).

TABLE II

| SAMPLE | THICKNESS PE FOAM | (MIL) ADHESIVE | BACKING DENSITY (pcf)* | Initial TENSILE (lb) | UNWIND (oz) | 1 MO @ 120° F. ADHESION BACKING (oz) | ADHESION STEEL (oz) | UNWIND (oz) | ADHESION BACKING (oz) | ADHESION STEEL (oz) |
|---|---|---|---|---|---|---|---|---|---|---|
| 1 | 1.0 | 7.1 | 5.9 | 37 | 27.1 | 93.8 | 27.1 | 58.3 | 46.5 | 23.9 | 46.3 |
| 2 | 1.0 | 7.7 | 5.6 | 36 | 25.3 | 75.2 | 26.1 | 59.1 | 30.8 | 25.1 | 46.5 |
| 3 | 1.0 | 5.5 | 3.6 | 38 | 26.4 | 80.3 | 26.8 | 71.1 | 29.1 | 23.5 | 51.7 |
| 4 | 1.0 | 5.5 | 3.6 | 38 | 27.4 | — | — | — | — | — | — |
| CONTROL | 5.0 | — | 5.2 | 57 | 27.5 | 66.3 | 26.8 | 52.0 | 33.5 | 31.6 | 60.3 |
| CONTROL | 5.5 | — | 5.4 | 57 | 27.0 | — | — | — | — | — | — |
|  | — | 4.5 | — | 34 | 3.3 | — | — | — | — | — | — |
|  | 4.3 | — | — | 57 | 8.2 | — | — | — | — | — | — |

*POUNDS PER CUBIC FOOT

In the foregoing comparative analysis, it is to be noted that the two control duct tapes employed a similar but somewhat different adhesive formulation due to adhesive stock availability. Accordingly, it cannot be said that the designated tensile strength numbers for the control are entirely as they would be if the exact same adhesive were used. In this context, they do not constitute a perfect control experiment. Nevertheless, their properties are so close that it is considered they show that the tensile strength at break in the test samples is not affected by the presence of the foam in the tapes of this invention. This is quite surprising in view of the fact that one skilled in the art would have expected the tensile strength to be reduced by the foam layer due to the fact that the foam layer itself has a lower tensile strength than would a solid layer of the same plastic and thickness.

No distortion of the foam cells in the tapes of this invention (having skin backing) occured during these tests, nor did adhesive delaminate from the tape. Photomicrographs indicated that the foam layer thickness was the same before and after calendering, thereby establishing that the foam cells are not being crushed upon adhesive calendering.

The foregoing experiments indicate that the present invention provides a reduction in polyethylene consumption of on the order of 30–40%. After figuring in the cost of the CBA, it is calculated that an approximate 20–30% savings in the cost of the LDPE can be realized.

As stated previously, while polyethylene is the preferred backing material, other materials may be employed. In the selection of suitable materials, in general such factors as cost, flexibility, cohesion and compatability (e.g. polarity and wettability) are to be considered. In general, it is contemplated tha other polyolefins such as polypropylene and various ethylene copolymers such as ethylenevinylacetate, ethyleneacrylic acid, ethylenemethylacrylate and the like may be employed to produce the foam and/or skin. In any event, the substitution of other materials for the polyethylene in the illustrative example will be a matter of individual choice within the expected judgment of the skilled worker, as will be the particular thicknesses of the backing materials and/or adhesives.

In the foregoing description, reference has been made to the use of woven cloth webs because of their tearability in the cross-direction. If finger tearability is not a consideration and mechanical severance in the CD is instead contemplated and acceptable, it will be appreciated that nonwovens may be employed instead.

Accordingly, as used herein and in the appended claims the term "cloth" denotes both woven and nonwoven cloth fabrics.

In lieu of applying the foam directly on the cloth material, as heretofore described, it would be within the scope of this invention to provide an intermediate layer, e.g. a tie-coat to increase adhesion. In like manner, the tie coat, primer or other layer may be provided between the adhesive caoting and the cloth.

Since certain changes may be made without departing from the scope of the invention herein described, it is intended that all matter contained in the foregoing description, including the examples and drawing shall be taken as illustrative and not in a limiting sense.

We claim:

1. In adhesive tape comprising an adhesive coated onto a backing comprising a cloth material and a layer of plastic,
the improvement wherein said plastic comprises a foam having a thin plastic skin adhered to the outer surface thereof.

2. An adhesive tape as defined in claim 1 wherein at least one of said foam and said skin comprises polyethylene.

3. An adhesive tape as defined in claim 2 wherein both of said foam and said skin comprise polyethylene.

4. An adhesive tape as defined in claim 3 wherein said polyethylene is a low density polyethylene.

5. An adhesive tape as defined in claim 1 wherein said adhesive layer comprises a pressure-sensitive adhesive.

6. An adhesive tape comprising a cloth material contained substantially within a plastic foam layer; a layer of adhesive adhered to one surface of said cloth and foam; and a thin outer plastic skin adhered to the opposed surface of said cloth and foam.

7. An adhesive tape as defined in claim 6 wherein said foam possesses a substantially uniform cell distribution.

8. An adhesive tape as defined in claim 7 wherein each said plastic comprises polyethylene.

9. An adhesive as defined in claim 8 wherein said adhesive layer comprises a pressure-sensitive adhesive.

10. A method for preparing an adhesive tape comprising the steps of:
    (1) coextruding a polymeric melt comprising a plastic layer of foam and a thin plastic skin onto a cloth material so that said foam layer is applied first to said cloth; and
    (2) thereafter coating an adhesive layer on the opposed surface of said cloth.

11. A method as defined in claim 10 wherein said adhesive coating is applied by calendering.

12. A method as defined in claim 10 wherein said foam layer is provided by heating a mixture of said plastic and a chemical blowing agent.

13. A method as defined in claim 12 wherein said plastic comprises polyethylene particles.

* * * * *